United States Patent [19]

Chung et al.

[11] Patent Number: 5,324,430

[45] Date of Patent: Jun. 28, 1994

[54] HIGH PERFORMANCE PAN COMPOSITE MEMBRANES

[75] Inventors: Tai-Shung Chung, Randolph; E. Ronald Kafchinski, Winfield; Mark Spak, Edison; Brenda Bembry-Ross, Newark, all of N.J.; C. Glen Wensley, Orange, Calif.

[73] Assignee: Hoechst Celanese Corp., Somerville, N.J.

[21] Appl. No.: 25,541

[22] Filed: Mar. 3, 1993

Related U.S. Application Data

[63] Continuation-in-part of Ser. No. 993,931, Dec. 18, 1992.

[51] Int. Cl.[5] .............................................. B01D 71/42
[52] U.S. Cl. ............................ 210/500.23; 210/500.43
[58] Field of Search ...................... 55/16, 158; 264/41, 264/49; 427/245, 246; 210/490, 500.43, 508, 500.23

[56] References Cited

U.S. PATENT DOCUMENTS 4,230,463 10/1980 Henis et al. ........................ 55/68 X
5,087,367 2/1992 Tsuyumoto et al. ............ 210/654 X Primary Examiner—Frank Spear
Attorney, Agent, or Firm—Joseph M. Mazzarese

[57] ABSTRACT

A composite fiber or film for use in a fluid separation membrane made of PAN coated with an intermediate permeable material and further coated with a selective layer. The PAN fiber or film is pre-wet with perfluoroether prior to being coated with the intermediate material, to produce a membrane material having enhanced permeability. The selective layer produces a high separation factor.

14 Claims, 1 Drawing Sheet

HIGH PERFORMANCE PAN COMPOSITE MEMBRANES

This application is a continuation-in-part of patent application Ser. No. 993,931 entitled "PAN COMPOSITE MEMBRANES" filed Dec. 18, 1992.

BACKGROUND OF THE INVENTION

This invention relates to the field of composite membranes, particularly those that comprise microporous polyacrylonitrile ("PAN") fiber or film having a selective layer comprising 4-polyvinylpyridine ("PVP") or the polyimide that is the polymerization product of 2,2-bis(3,4-dicarboxyphenyl)hexafluoropropane dianhydride and 3,5-diaminobenzonitrile] ("6FDA-DBN").

In creating a gas or liquid separation membrane, it is desirable to have both a high rate of permeation or throughput and a high separation factor. (The separation factor of two components to be separated is defined as the ratio of the permeance of the component that preferentially passes through the separation membrane to the permeance of other component.) This combination of characteristics permits the effective separation of a relatively large volume of fluid per unit time. Large rates of permeation also allow the membrane to be operated at lower pressures, which improves cost-effectiveness.

Highly porous membranes tend to be very permeable, but perform poorly at separating fluids into their components. Less porous, dense membranes can be more selective, but at the cost of reduced throughput.

Asymmetric membranes generally have a thin, dense separation or selective layer and a less dense, more permeable layer. These asymmetric membranes are often chosen for separation applications because they may provide a good combination of permeation and separation. Hollow fibers having a dense skin and a porous body can be used to make such membranes.

Polyacrylonitrile hollow fiber may be coated with another material that serves as a selective layer to form a useful separation membrane, but the throughput of the PAN composite membrane may be too low for practical purposes.

U.S. Pat. No. 3,851,036, issued to Tzentis, describes a method for making asymmetric hollow fibers comprising acrylonitrile polymers, which fibers may be used in dialysis cells or textiles.

A process for producing hollow polyacrylonitrile separation membranes in fibrous form is described in U.S. Pat. No. 4,409,162, issued to Takeo. In this process, a membranous product is shaped in hollow fiber form from a solution of PAN and subsequently removing solvent to produce an asymmetric porous separation membrane.

U.S. Pat. No. 4,756,932 issued to Puri describes a process for making highly permeable coated composite hollow fiber membranes. The hollow fiber substrate is passed continuously through a polymeric coating solution and withdrawn through a coating die to form a uniform coating.

U.S. Pat. No. 4,881,954 issued to Bikson, et al. describes permeable membranes for enhanced gas separation in which an asymmetric porous support is coated with a separation layer. The support is made asymmetric prior to coating to provide mechanical stability and a uniform support surface.

U.S. Pat. No. 4,935,141, issued to Buck, et al., describes asymmetric composite separation membranes for use in hemodialysis. These membranes may comprise PAN.

U.S. Pat. No. 4,960,519, issued to Pasternak, et al., describes a membrane process for separation of organic liquids using a composite membrane in which polyacrylonitrile is the support layer.

U.S. Pat. application 739,063 by Chung, et al., filed on Aug. 1, 1991 and entitled "HIGH SELECTIVITY HOLLOW FIBERS", describes asymmetric hollow fibers comprising SIXEF ™-Durene polyimide coated with PVP. The disclosure of this application is incorporated herein by reference.

SUMMARY OF THE INVENTION

The present invention comprises a composite fiber or film, for use in a fluid separation membrane, comprising a microporous PAN fiber or film, a selective layer of PVP or 6FDA-DBN, and an intermediate layer positioned between and bonded to said PAN and said selective layer, said intermediate layer being at least as permeable to fluids as said selective layer, wherein said composite fiber or film has an oxygen permeance of at least about 50,000 Barrers/cm and an oxygen/nitrogen separation factor of at least about 4.5 at 25° C. Preferably, said intermediate layer is a polyimide, more preferably an aromatic fluoropolyimide such as SIXEF ™-Durene polyimide.

It is an object of the present invention to provide a PAN composite fiber or film having both good selectivity and good permeability.

It is another object of the present invention to provide a composite membrane containing a hollow microporous PAN fiber and a PVP or 6FDA-DBN selective layer.

It is a further object of this invention to provide a a highly selective microporous composite membrane.

It is also an object of this invention to provide a method for improving the selectivity of PAN composite membranes.

Other objects and advantages of the present invention will be apparent to those skilled in the art from the following description and the appended claims.

DETAILED DESCRIPTION OF THE PREFERRED EMBODIMENTS

Figure 1:
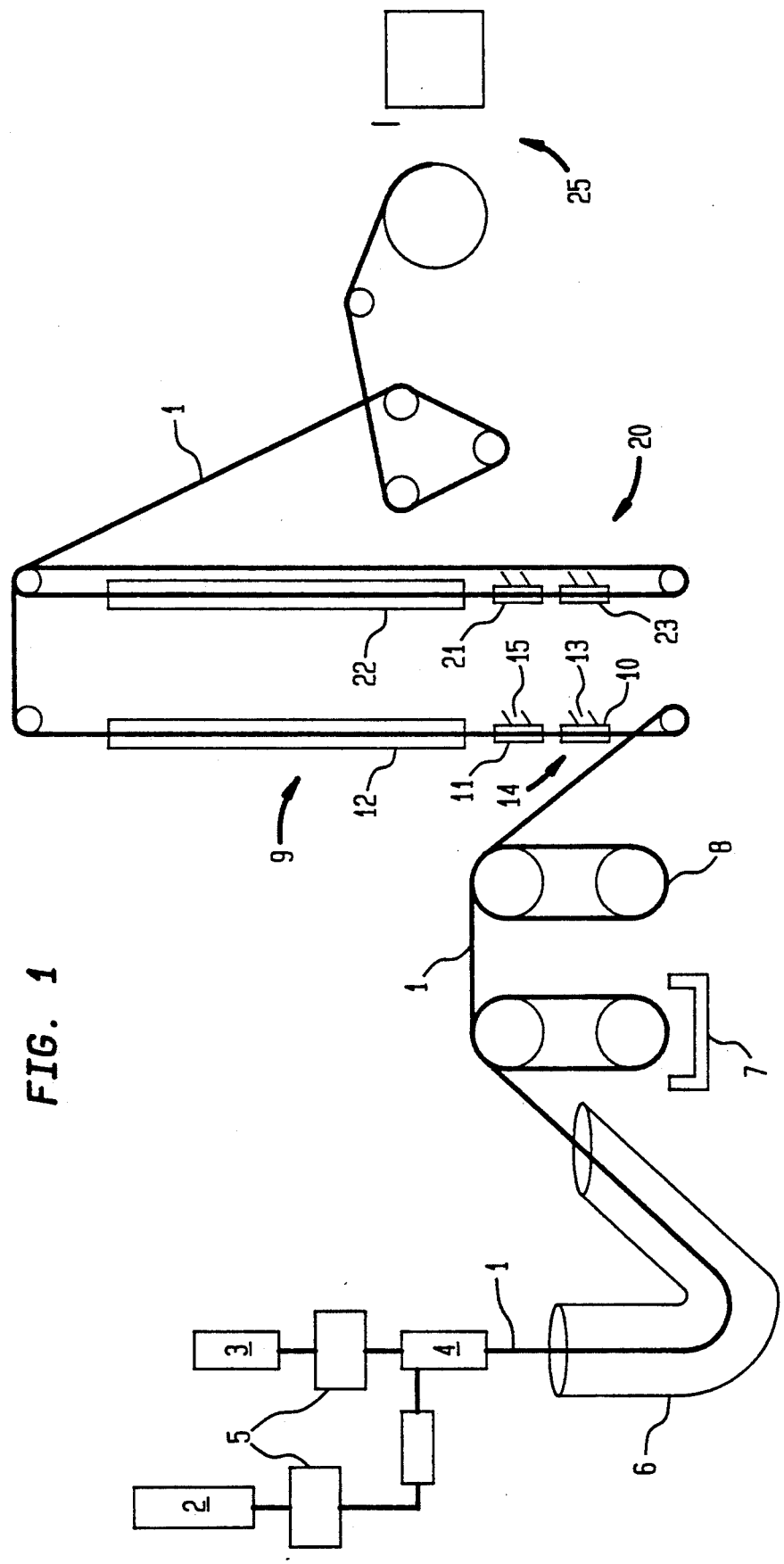
FIG. 1 illustrates one embodiment of a process and apparatus for making a composite fiber according to the present invention.

FIG. 1 illustrates a preferred method of making a composite fiber according to the present invention. In the illustrated embodiment, a microporous PAN hollow fiber 1 is made by feeding a PAN dope from a dope reservoir 2 and a core solvent from a solvent reservoir 3 into a hollow fiber spinneret 4 using pumps 5. A wet hollow PAN fiber 1 emerges from the spinneret 4 and passes through a coagulation bath 6, a solvent exchanger 7, and a dryer 8. These steps solidify the fiber 1 and remove the solvent, producing the desired dry, hollow, microporous fiber 1.

The fiber 1 travels vertically upward through a first coating section 9 comprising a pre-wetting station 10, a coating station 11, and a drying column 12.

The fiber 1 first passes through the pre-wetting station 10 where a perfluoroether mixture is applied to the fiber 1 through an inlet 13. The fiber 1 then passes through an air gap 14 and into the coating station 11 where a solution or dope containing a permeable polymer is applied to the fiber 1 through an inlet 15.

The dope-coated fiber 1 enters the drying column 12, which is maintained at an elevated temperature to promote evaporation of the solvent from the polymer solution coating. A gas, e.g. nitrogen, may be passed through the drying column to facilitate drying.

The dry coated fiber 1 then enters a second coating section 20 where a selective polymer dope containing PVP or 6FDA-DBN is applied over the dry permeable polymer layer at a second coating station 21 and dried in a drying column 22. The procedure is essentially the same as was followed in the first coating section 9, although the temperature and solvent may differ. Application of perfluoroether to the permeable polymer layer or coating at a pre-wetting station 23 prior to coating in the second section 20 is optional.

The dry composite fiber is then collected at a take-up unit 25.

The perfluoroether is applied to the fiber by any suitable method known in the art. For example, it may be slowly dripped onto the fiber, or applied with an applicator, e.g. a sponge, swab or cloth. Any perfluoroether or mixture of perfluoroethers may be used in the practice of this invention, including commercially available products such as FC-72 FLUORINERT TM Brand Electronic Liquid (sold by 3M Corporation, and containing a mixture of perfluoroethers having from 5-18 carbon atoms), or the like.

The permeable polymer dope and the selective polymer dope also may be applied by any means known in the art.

The permeable polymer dope and the selective polymer dope each may include any suitable solvent, i.e., one in which the respective polymer is sufficiently soluble and which will evaporate during the drying operation. The optimum temperature and time period used for drying in a particular case will depend on chemical composition and polymer concentration of the polymer dope.

The permeable polymer may be any suitable polymer that exhibits a significant degree of permeability to the fluids that are to be separated. For example, a polymer that is permeable to oxygen and nitrogen may be applied to form a gas separation membrane suitable for air separations.

Any permeable polymer capable of being coated on a fiber or film may be used in this invention, provided that the polymer is not miscible with the perfluoroether. Examples of suitable polymers include polyimides, particularly aromatic fluoropolyimides, such as SIXEF TM -Durene polyimide (the polymerization product of 2,2-bis[3,4-dicarboxyphenyl] hexafluoropropane dianhydride and 2,3,5,6-tetramethylphenylene diamine monomers, available from Hoechst Celanese Corporation).

The intermediate layer comprising the permeable polymer acts as a gutter layer to facilitate fluid flow through the membrane material. It preferably also provides a smooth, relatively defect-free surface for the selective polymer layer, thus aiding in the formation of a uniform coating. By forming a selective layer having a uniform thickness and little or no significant defects, the separation factor of the membrane is enhanced. Preferably, the applied thickness of this permeable layer is no greater than about one micron.

The preferred perfluoroethers are volatile and evaporate from the fiber at a significant rate. It is necessary, therefore, to coat the fiber with the permeable polymer dope before all the perfluoroether evaporates. However, if too much perfluoroether is present on the fiber it will get into the polymer dope and make it more difficult to uniformly coat the fiber. For this reason, an air gap may be used to allow partial evaporation of the perfluoroether(s) prior to coating. Whether an air gap is needed, and the exact size of the air gap, will depend on several factors, such as the rate of application of perfluoroether, the fiber's speed, the volatility of the perfluoroether used, the temperature at which the operation occurs, and the like. Those skilled in the art will be able to determine the optimum gap and other parameters for a given system.

The presence of perfluoroether in the pores of the fiber is believed to prevent the polymer dope from deeply penetrating the pores, thus reducing the effective thickness of the polymer coating and increasing the permeability therethrough.

In the preferred embodiment of the present invention illustrated above, the PAN microporous hollow fiber is coated directly after it is spun. A continuous process can be set up wherein PAN fiber is spun and the spun fiber is fed directly into the coating apparatus of the present invention, so that both operations are in one line. However, previously spun and collected PAN fiber may also be coated according to the present invention.

The PAN fiber may be made according to any method known in the art for producing a microporous PAN fiber. Preferably, the fiber will be hollow.

Although the above embodiments have focused on PAN fiber, PAN film may also be coated according to the present invention, either in a continuous or discontinuous process. By treating a surface of the film with perfluoroether and then coating the treated surface with a permeable polymer, followed by a PVP coating operation, a PVP-PAN composite separation membrane having enhanced permeability may be obtained. A PAN film may be made according to any method known in the art.

The composite fiber or film of the present invention is suited for air separation, i.e. as a membrane for separating oxygen gas from nitrogen gas. Typically the fiber or film has both an oxygen permeance of at least about 50,000 Barrers/cm, preferably at least about 100,000 Barrers/cm, and most preferably at least about 200,000 Barrers/cm, and an oxygen/nitrogen separation factor (defined as: oxygen permeance/nitrogen permeance) of at least about 4.5, preferably at least about 5.0, and most preferably at least about 6.0, at 25° C.

The permeance and separation factor of this film or fiber membrane will vary as a result of a variety of factors. One notable factor is the thickness of the selective layer; generally, the separation factor varies in the same direction as the thickness of this layer while the permeance varies in the inverse direction. For example, if a PVP selective layer about 1500 angstroms thick the membrane may have a very high separation factor, e.g. above 8.0, but the oxygen permeance may be relatively low, e.g. below 60,000 Barrers/cm, whereas if the PVP is about 500 angstroms thick the membrane may have a separation factor of in the approximate range of 6.0 to 7.5 and an oxygen permeance of greater than 80,000 Barrers/cm. A thinner PVP layer will further increase the permeance at the cost of some separation factor.

Selective layer thicknesses in the approximate range of 200–1000 angstroms are suitable in the practice of this invention. A selective layer thickness of approximately 200–500 angstroms is preferred to achieve an excellent combination of gas throughput and separation factor; membranes according to this invention having a PVP selective layer of such thickness may exhibit an oxygen permeance of about 100,000–400,000 Barrers/cm combined with an oxygen/nitrogen separation factor of at least about 5.0 at 25° C. under a pressure of about 20–150 psi.

The intermediate layer should be at least as permeable to the fluids to be separated as is the selective layer, and preferably more permeable. In a preferred embodiment of the present invention, the intermediate layer comprises an aromatic fluoropolyimide, most preferably SIXEF ™-Durene polyimide (the polymerization product of 2,2-bis[3,4-dicarboxyphenyl]hexafluoropropane dianhydride and 2,3,5,6-tetramethylphenylene diamine monomers, available from Hoechst Celanese Corporation), and has a thickness in the approximate range of 0.5–1.0 micron. However, other thicknesses and other materials may be used for the intermediate layer; those skilled in the art will be able to identify appropriate permeable materials and thicknesses without undue experimentation.

The following Examples are presented to illustrate the present invention, but should not be construed as limiting the scope of this invention.

EXAMPLE I

A PAN microporous hollow fiber having an outer diameter of 500 μm was prepared from a 24% PAN/NMP dope having a viscosity of 650 poise at 30° C. and was coated to form a composite fiber according to the present invention by the following procedure.

The fiber was passed at 6 meters/min through a coating apparatus comprising the following sections in the following order: a pre-wetting station where FC-72 FLUORINERT ™ Brand Electronic Liquid (boiling point = 56° C.) was applied to the outer surface of the PAN fiber using an Isco ® syringe pump; an air gap of 10 cm; a coating station where a dope containing 2% by weight SIXEF ™-Durene polyimide in chloroform was deposited onto the pre-wet fiber using a glass coater to form a polyimide layer about 1.0 micron thick; a drying column (70° C.); a pre-wetting station where FC-72 FLUORINE ™ Brand Electronic Liquid was applied over the polyimide layer; an air gap of 4 cm; a coating station where a dope containing 0.5% by weight PVP in methanol solvent was solution coated using a precision metering pump onto the pre-wet fiber; and, a drying column (70° C.). Mass balance calculations indicated that the PVP coating was 270 Å thick.

The fiber prepared by this process was collected, cut, and sealed into two gas separation modules, each containing 100 strands of fiber 20 inches long. These fibers were tested by forcing oxygen and nitrogen through the modules from the shell side under a pressure of 20 psi at about 25° C.; Table 1 presents the calculated permeance and separation factor, $\alpha(O_2/N_2)$, for each module.

TABLE 1

|  | $\alpha(O_2/N_2)$ | $O_2$ Permeance (Barrer/cm) |
|---|---|---|
| Module 1 | 5.0 | $3.22 \times 10^5$ |
| Module 2 | 5.0 | $3.97 \times 10^5$ |

EXAMPLE II

PAN microporous hollow fiber of the type used in Ex. I was coated and used to make a module according to the procedure of Ex. I, except that the PVP concentration in the dope was 0.7%. Based on mass balance, the PVP coating was 420 Å thick. The results are presented in Table 2.

TABLE 2

|  | $\alpha(O_2/N_2)$ | $O_2$ Permeance (Barrer/cm) |
|---|---|---|
| Module 3 | 5.6 | $3.22 \times 10^5$ |

EXAMPLE III

Fibers were prepared according to the procedure of Ex. I using solutions of 6FDA-DBN dissolved in dichloromethane instead of PVP/methanol to form a selective layer; these solutions were 0.5% and 0.7% 6FDA-DBN by weight, and they produced coating thicknesses of 450 and 990 Å, respectively. The results are shown in Table 3, below.

TABLE 3

| 6FDA-DBN Concentration (%) | $\alpha(O_2/N_2)$ | $O_2$ Permeance (Barrer/cm) |
|---|---|---|
| 0.5 | 5.1 | $3.70 \times 10^5$ |
| 0.7 | 5.9 | $2.66 \times 10^5$ |

Many variations of the present invention not illustrated herein will occur to those skilled in the art. The present invention is not limited to the embodiments illustrated and described herein, but encompasses all the subject matter within the scope of the appended claims.

We claim:

1. A composite fiber for use in a fluid separation membrane comprising:
    a microporous polyacrylonitrile fiber;
    a selective layer comprising polyvinylpyridine or poly[2,2-bis(3,4-dicarboxyphenyl)hexafluoropropanedianhydride-3,5-diaminobenzonitrile]; and
    an intermediate polymer layer positioned between and bonded to said polyacrylonitrile fiber and said selective layer, said intermediate layer being at least as permeable to fluids as said selective layer, wherein said composite fiber has an oxygen permeance of at least about 50,000 Barrers/cm and an oxygen/nitrogen separation factor of at least about 4.5 at 25° C.

2. A composite fiber according to claim 1 wherein said selective layer has a thickness in the approximate range of 200–1000 angstroms.

3. A composite fiber according to claim 1 wherein said intermediate layer comprises an aromatic fluoropolyimide and has a thickness in the approximate range of 0.5–1.0 microns.

4. A composite fiber according to claim 3 wherein said selective layer has a thickness in the approximate range of 200–1000 angstroms.

5. A composite fiber according to claim 1 having an oxygen permeance of at least about 100,000 Barrers/cm.

6. A composite fiber according to claim 1 having a separation factor of at least about 5.0.

7. A composite fiber according to claim 1 having a separation factor of at least about 6.0.

8. A composite fiber according to claim 1 wherein said intermediate layer comprising a fluoropolyimide, and wherein said composite fiber has an oxygen permeance of at least about 100,000 Barrers/cm and an oxygen/nitrogen separation factor of at least about 5.0 at 25° C.

9. A composite fiber according to claim 8 having a separation factor of at leat about 6.0.

10. A composite fiber for use in a fluid separation membrane made according to a process comprising:
applying a perfluoroether to a surface of a microporous polyacrylonitrile fiber;
coating said surface with a permeable polymer to form a permeable layer bonded to said fiber; and,
coating said permeable layer with a selective polymer layer comprising polyvinylpyridine or poly[2,2-bis(3,4-dicarboxyphenyl)hexafluoropropanedianhydride-3,5-diaminobenzonitrile] to form a selective layer bonded to said said permeable layer, wherein said permeable layer is at least as permeable to fluids as said selective layer.

11. A composite fiber according to claim 10 wherein said selective layer has a thickness in the approximate range of 200–1000 angstroms.

12. A composite fiber according to claim 10 wherein said permeable polymer layer comprises an aromatic fluoropolyimide.

13. A composite film for use in a fluid separation membrane comprising:
a microporous polyacrylonitrile film;
a selective layer comprising polyvinylpyridine or poly[2,2-bis(3,4-dicarboxyphenyl)hexafluoropropanedianhydride-3,5-diaminobenzonitrile]; and
an intermediate polymer layer positioned between and bonded to said polyacrylonitrile film and said selective layer, said intermediate layer being at least as permeable to fluids as said selective layer, wherein said composite film has an oxygen permeance of at least about 50,000 Barrers/cm and an oxygen/nitrogen separation factor of at least about 4.5 at 25° C.

14. A film according to claim 13 having a separation factor of at least about 5.0.

* * * * *